(12) United States Patent
Ka et al.

(10) Patent No.: US 12,355,103 B2
(45) Date of Patent: Jul. 8, 2025

(54) SEPARATOR FOR LITHIUM SECONDARY BATTERY AND METHOD FOR MANUFACTURING THE SAME

(71) Applicant: LG ENERGY SOLUTION, LTD., Seoul (KR)

(72) Inventors: Kyung-Ryun Ka, Daejeon (KR); Jin-Young Shin, Daejeon (KR); Sang-Joon Lee, Daejeon (KR); Je-An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 522 days.

(21) Appl. No.: 17/801,423

(22) PCT Filed: Feb. 26, 2021

(86) PCT No.: PCT/KR2021/002513
§ 371 (c)(1),
(2) Date: Aug. 22, 2022

(87) PCT Pub. No.: WO2021/172958
PCT Pub. Date: Sep. 2, 2021

(65) Prior Publication Data
US 2023/0086309 A1 Mar. 23, 2023

(30) Foreign Application Priority Data
Feb. 27, 2020 (KR) .................. 10-2020-0024456

(51) Int. Cl.
*H01M 50/449* (2021.01)
*H01M 10/0525* (2010.01)
(Continued)

(52) U.S. Cl.
CPC ..... *H01M 50/449* (2021.01); *H01M 10/0525* (2013.01); *H01M 50/403* (2021.01);
(Continued)

(58) Field of Classification Search
CPC ............. H01M 50/449; H01M 50/414; H01M 50/403; H01M 50/426; H01M 50/491;
(Continued)

(56) References Cited

U.S. PATENT DOCUMENTS

2013/0149587 A1  6/2013  Yu et al.
2013/0224555 A1  8/2013  Hong et al.
(Continued)

FOREIGN PATENT DOCUMENTS

CN  109378428 A  2/2019
CN  109742292 A  5/2019
(Continued)

OTHER PUBLICATIONS

Extended European Search Report for European Application No. 21759745.9, dated Aug. 7, 2024.
(Continued)

*Primary Examiner* — Sarah A. Slifka
(74) *Attorney, Agent, or Firm* — Birch, Stewart, Kolasch & Birch, LLP (57) ABSTRACT

A separator for a lithium secondary battery. The separator for a lithium secondary battery is provided with a porous coating layer including small-particle diameter inorganic particles, large-particle diameter inorganic particles and adhesive polymer particles. The porous coating layer has a predetermined level of porosity. The separator has reinforced heat resistance, reduced resistance and improved peel strength to a porous polymer substrate.

14 Claims, 1 Drawing Sheet

(51) Int. Cl.
  *H01M 50/403* (2021.01)
  *H01M 50/414* (2021.01)
  *H01M 50/42* (2021.01)
  *H01M 50/426* (2021.01)
  *H01M 50/434* (2021.01)
  *H01M 50/446* (2021.01)
  *H01M 50/491* (2021.01)

(52) U.S. Cl.
  CPC ......... *H01M 50/414* (2021.01); *H01M 50/42* (2021.01); *H01M 50/426* (2021.01); *H01M 50/434* (2021.01); *H01M 50/446* (2021.01); *H01M 50/491* (2021.01)

(58) Field of Classification Search
  CPC ... H01M 50/446; H01M 50/434; H01M 50/42
  See application file for complete search history.

(56) References Cited

U.S. PATENT DOCUMENTS

| | | |
|---|---|---|
| 2014/0295170 A1 | 10/2014 | Kim et al. |
| 2015/0263325 A1 | 9/2015 | Honda et al. |
| 2015/0303427 A1 | 10/2015 | Hyun et al. |
| 2016/0268571 A1 | 9/2016 | Honda |
| 2018/0337381 A1 | 11/2018 | Seo et al. |
| 2019/0020007 A1 | 1/2019 | Hasegawa et al. |
| 2019/0067748 A1 | 2/2019 | Saeki et al. |
| 2020/0203690 A1 | 6/2020 | Kwon et al. |
| 2020/0403205 A1 | 12/2020 | Lee et al. |
| 2021/0265702 A1 | 8/2021 | Yao et al. |

FOREIGN PATENT DOCUMENTS

| | | |
|---|---|---|
| JP | 2013-22878 A | 2/2013 |
| JP | 2015-115132 A | 6/2015 |
| JP | 2018-147578 A | 9/2018 |
| KR | 10-2013-0048843 A | 5/2013 |
| KR | 10-1298340 B1 | 8/2013 |
| KR | 10-2015-0001148 A | 1/2015 |
| KR | 10-2015-0037394 A | 4/2015 |
| KR | 10-1515357 B1 | 4/2015 |
| KR | 10-2016-0054937 A | 5/2016 |
| KR | 10-2016-0101895 A | 8/2016 |
| KR | 10-2017-0093606 A | 8/2017 |
| KR | 10-2017-0129642 A | 11/2017 |
| KR | 10-2019-0044529 A | 4/2019 |
| KR | 10-2019-0097531 A | 8/2019 |
| WO | WO 2012/150838 A2 | 11/2012 |
| WO | WO 2014/088988 A1 | 6/2014 |
| WO | WO 2016/157770 A1 | 10/2016 |
| WO | WO 2017/146237 A1 | 8/2017 |
| WO | WO 2020/000164 A1 | 1/2020 |

OTHER PUBLICATIONS

International Search Report (PCT/ISA/210) issued in PCT/KR2021/002513, dated Jun. 16, 2021.

SEPARATOR FOR LITHIUM SECONDARY BATTERY AND METHOD FOR MANUFACTURING THE SAME

TECHNICAL FIELD

The present disclosure relates to a separator applicable to an electrochemical device, such as a lithium secondary battery, and a method for manufacturing the same.

The present application claims priority to Korean Patent Application No. 10-2020-0024456 filed on Feb. 27, 2020 in the Republic of Korea, the disclosures of which are incorporated herein by reference.

BACKGROUND ART

Recently, an energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni—MH, Ni—Cd and sulfuric acid-lead batteries using an aqueous electrolyte.

Although electrochemical devices, such as lithium secondary batteries, have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a positive electrode and a negative electrode.

To solve the above-mentioned safety problems of an electrochemical device, there has been suggested a separator having a porous coating layer formed by applying a mixture of an excessive amount of inorganic particles with a binder polymer onto at least one surface of a porous polymer substrate having a plurality of pores.

Although such a separator ensures heat resistance through the inorganic particles contained in the porous coating layer, it is required for the separator to ensure additional safety, as the currently developed electrode assemblies have gradually increasing energy density.

Meanwhile, when the content of the inorganic particles is increased in order to increase heat resistance, the content of a binder polymer for adhering the inorganic particles is also increased to cause an increase in resistance undesirably. When the content of the binder polymer is reduced in order to reduce resistance, peel strength to a porous substrate is degraded undesirably.

DISCLOSURE

Technical Problem

The present disclosure is designed to solve the problems of the related art, and therefore the present disclosure is directed to providing a separator for a lithium secondary battery which has improved heat resistance as compared to the related art.

The present disclosure is also directed to providing a separator which has improved heat resistance, reduced electrical resistance and improved peel strength to a porous substrate.

Technical Solution

In one aspect of the present disclosure, there is provided a separator for a lithium secondary battery according to any one of the following embodiments.

According to the first embodiment, there is provided a separator for a lithium secondary battery, which includes:
- a porous polymer substrate having a plurality of pores; and
- a porous coating layer formed on at least one surface of the porous polymer substrate, wherein the porous coating layer includes a plurality of inorganic particles and adhesive polymer particles positioned on the whole or a part of the surface of the inorganic particles to connect and fix the inorganic particles with one another,
- wherein the inorganic particles include small-particle diameter inorganic particles having a diameter ($D_{50}$) of 10-100 nm and large-particle diameter inorganic particles having a diameter ($D_{50}$) of 600 nm or more, and an amount of the small-particle diameter inorganic particles is 30 parts by weight or more based on 100 parts by weight of the total amount of the inorganic particles,
- the adhesive polymer particles have a diameter ($D_{50}$) of 200 nm or less, and
- the porous coating layer has a porosity of 40-50%.

Herein, the peel strength between the porous polymer substrate and the porous coating layer is 50 gf/15 mm or more, and the separator may satisfy the following Formula 1:

$$(MD+TD)/2 \leq 10\%, \qquad \text{[Formula 1]}$$

wherein MD represents the heat shrinkage of the separator in the machine direction (MD), and TD represents the heat shrinkage of the separator in the transverse direction (TD), and the heat shrinkage is calculated by the formula of (Initial length of separator−Length after heat shrinking treatment at 150° C. for 30 minutes)/(Initial length of separator)×100.

Herein, the content of the small-particle diameter inorganic particles may be 30-50 parts by weight based on 100 parts by weight of the total content of the inorganic particles.

Herein, the adhesive polymer particles may include any one selected from the group consisting of styrene butadiene rubber (SBR), acrylonitrile-butadiene rubber, acrylonitrilebutadiene-styrene rubber, polybutyl acrylate-co-ethylhexyl acrylate, polymethyl methacrylate-co-ethylhexyl acrylate, polyacrylonitrile, polyvinyl chloride, polyvinylidene fluoride, polyvinyl alcohol, styrene and polycyanoacrylate, or a mixture of two or more of them.

Herein, each of the small-particle diameter inorganic particle and the large-particle diameter inorganic particles may independently include any one selected from the group consisting of $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_{3-x}PbTiO_3$ (PMNPT, $0<x<1$), hafnia ($HfO_2$), $SrTiO_3$, $SnO_2$, $CeO_2$, $MgO$, $NiO$, $CaO$, $ZnO$, $ZrO_2$, $Al_2O_3$, $AlO(OH)$, $TiO_2$ and SiC, or a mixture of two or more of them.

Herein, the small-particle diameter inorganic particles and the large-particle diameter inorganic particles may be the same or different.

Herein, the weight ratio of the total content of the inorganic particles to the adhesive polymer particles may be 50:50-99:1.

Herein, the porous coating layer may have a thickness of 1-10 μm.

In another aspect of the present disclosure, there is provided a lithium secondary battery according to the following embodiment.

Particularly, there is provided a lithium secondary battery including a positive electrode, a negative electrode and a separator interposed between the positive electrode and the negative electrode, wherein the separator is the same as defined in any one of the above-described embodiments.

In still another aspect of the present disclosure, there is provided a method for manufacturing a separator for a lithium secondary battery according to any one of the following embodiments.

Particularly, there is provided a method for manufacturing a separator for a lithium secondary battery including a porous polymer substrate having a plurality of pores, and a porous coating layer formed on at least one surface of the porous polymer substrate, the method including the steps of:
- (S1) preparing a slurry for forming a porous coating layer including small-particle diameter inorganic particles having a diameter ($D_{50}$) of 10-100 nm, large-particle diameter inorganic particles having a diameter ($D_{50}$) of 600 nm or more and adhesive polymer particles having a diameter ($D_{50}$) of 200 nm or less; and
- (S2) applying the slurry for forming a porous coating layer onto a porous polymer substrate, and drying the slurry to form a porous coating layer, wherein the slurry for forming a porous coating layer has a solid content of 25-35%.

Herein, the porous coating layer may have a porosity of 40-50%.

Herein, the content of the small-particle diameter inorganic particles may be 30-50 parts by weight based on 100 parts by weight of the total content of the inorganic particles.

Herein, the weight ratio of the total content of the inorganic particles to the adhesive polymer particles may be 50:50-99:1.

Herein, the peel strength between the porous polymer substrate and the porous coating layer is 50 gf/15 mm or more, and the separator may satisfy the following Formula 1:

$$(MD+TD)/2 \leq 10\%, \quad [\text{Formula 1}]$$

wherein MD represents the heat shrinkage of the separator in the machine direction (MD), and TD represents the heat shrinkage of the separator in the transverse direction (TD), and the heat shrinkage is calculated by the formula of (Initial length of separator−Length after heat shrinking treatment at 150° C. for 30 minutes)/(Initial length of separator)×100.

Advantageous Effects

According to an embodiment of the present disclosure, large-particle diameter inorganic particles and small-particle diameter inorganic particles having a different size are introduced to a porous coating layer to reduce the porosity of the porous coating layer as compared to the related art, thereby providing improved heat resistance.

Meanwhile, adhesive polymer particles are used in order to reduce the electrical resistance increased due to the use of the small-particle diameter inorganic particles, thereby providing a finished separator with reduced electrical resistance. Particularly, even when the adhesive polymer particles are applied onto the porous polymer substrate, they do not infiltrate into the pores in a porous polymer substrate, unlike non-particle shaped binder polymers, and thus cause no increase in electrical resistance.

According to an embodiment of the present disclosure, adhesive polymer particles having a predetermined size are used to improve the peel strength to the porous substrate.

According to an embodiment of the present disclosure, the porosity of the porous coating layer is controlled to provide a separator having excellent peel strength between the porous substrate and the porous coating layer, improved heat shrinkage and a low resistance value.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected indirectly to another portion' by way of the other element interposed between them. In addition, 'connection' covers electrochemical connection as well as physical connection.

Throughout the specification, the expression 'a part includes an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

A separator in an electrochemical device, such as a lithium secondary battery, may be provided with a porous coating layer on at least one surface of a porous polymer substrate having a plurality of pores, and the porous coating layer is formed by coating a mixture of an excessive amount of inorganic particles with a binder polymer.

Although such a separator ensures heat resistance through the inorganic particles contained in the porous coating layer, it is required for the separator to ensure additional safety, as the currently developed electrode assemblies have gradually increasing energy density.

Meanwhile, when the content of the inorganic particles is increased in order to increase heat resistance, the content of a binder polymer for adhering the inorganic particles is also increased to cause an increase in resistance undesirably. When the content of the binder polymer is reduced in order to reduce resistance, adhesion to a porous substrate is degraded undesirably.

To solve the above-mentioned problems, the present inventors have conducted intensive studies, and the present disclosure provides a separator having improved heat resistance, increased peel strength to the porous polymer substrate and reduced resistance by using two types of inorganic particles having a different diameter and a particle-shaped adhesive binder polymer to control the porosity of the porous coating layer.

Particularly, in a general aspect of the present disclosure, there is provided a separator for a lithium secondary battery, which includes:

a porous polymer substrate having a plurality of pores; and a porous coating layer formed on at least one surface of the porous polymer substrate, and containing a plurality of inorganic particles and adhesive polymer particles positioned on the whole or a part of the surface of the inorganic particles to connect the inorganic particles with one another and fix them, wherein the inorganic particles include small-particle diameter inorganic particles having a diameter ($D_{50}$) of 10-100 nm and large-particle diameter inorganic particles having a diameter ($D_{50}$) of 600 nm or more, and the content of the small-particle diameter inorganic particles is 30 parts by weight or more based on 100 parts by weight of the total content of the inorganic particles, the adhesive polymer particles have a diameter ($D_{50}$) of 200 nm or less, and the porous coating layer has a porosity of 40-50%.

Herein, the porous coating layer has a porosity of 50% or less, the peel strength between the porous polymer substrate and the porous coating layer is 50 gf/15 mm or more, and the separator may satisfy the following Formula 1:

$$(MD+TD)/2 \leq 10\%,$$ [Formula 1]

wherein MD represents the heat shrinkage of the separator in the machine direction (MD), and TD represents the heat shrinkage of the separator in the transverse direction (TD), and the heat shrinkage is calculated by the formula of (Initial length of separator−Length after heat shrinking treatment at 150° C. for 30 minutes)/(Initial length of separator)×100.

According to an embodiment of the present disclosure, the porosity of the porous coating layer is controlled to 40-50%. When the porosity of the porous coating layer is less than 40%, slurry for forming a porous coating layer has a high solid content to cause the problem of agglomeration of the small-particle diameter inorganic particles, resulting in the problem of an increase in resistance. When the porosity of the porous coating layer is larger than 50%, it is not possible to obtain desired heat resistance due to excessively high porosity.

According to an embodiment of the present disclosure, the porosity of the porous coating layer is controlled to 40-50% to provide a separator having a peel strength between the porous polymer substrate and the porous coating layer of 50 gf/15 mm or more and satisfying the heat shrinkage as defined in the above Formula 1. In addition, a separator having a resistance of 1 ohm or less, preferably 0.6 ohm or less, can be provided.

Figure 1:
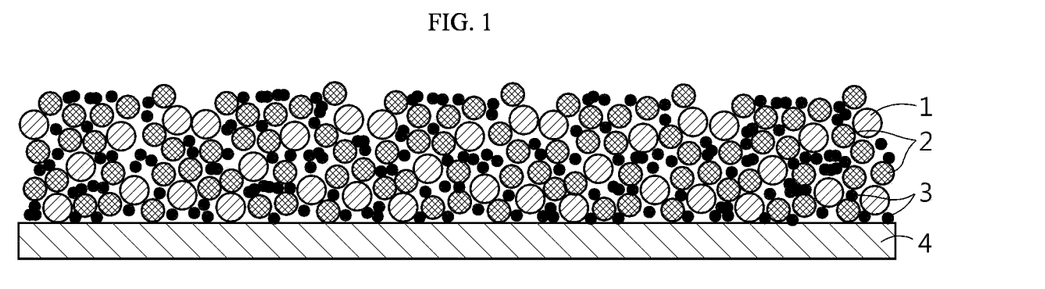
FIG. 1 is a schematic view illustrating the separator according to an embodiment of the present disclosure.
Figure 2:
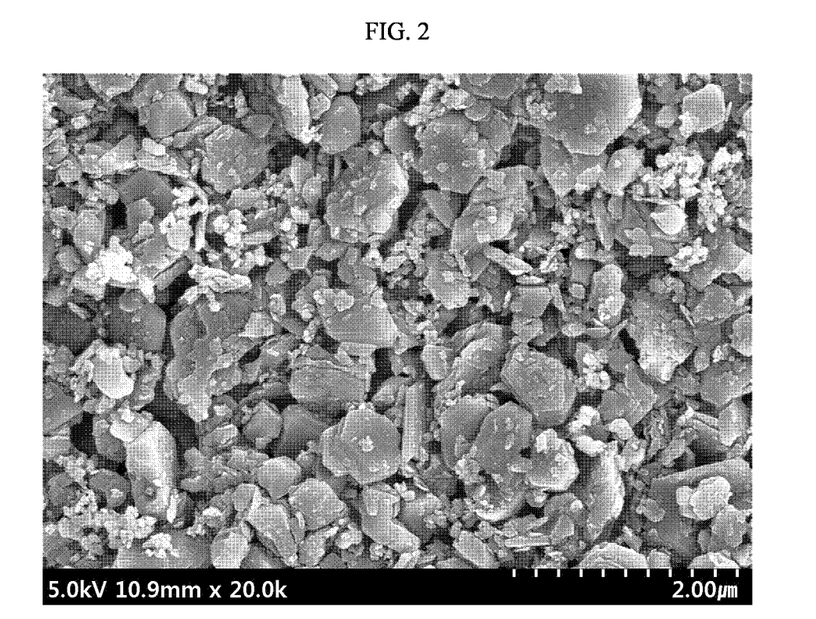
FIG. 2 is a scanning electron microscopic (SEM) image of the separator according to Example 2.

FIG. 1 is a schematic view illustrating the separator according to an embodiment of the present disclosure.

As shown in FIG. 1, the separator according to the present disclosure includes a porous polymer substrate 4; and a porous coating layer formed on at least one surface of the porous polymer substrate. The porous coating layer includes large-particle diameter inorganic particles 1, small-particle diameter inorganic particles 3 and adhesive polymer particles 2.

As used herein, "diameter ($D_n$)" means the diameter (particle diameter) at a point of n % in the particle number cumulative distribution depending on particle diameter. In other words, diameter ($D_{50}$) means a particle diameter at a point of 50% in the particle number cumulative distribution depending on particle diameter, diameter ($D_{90}$) means a particle diameter at a point of 90% in the particle number cumulative distribution depending on particle diameter, and diameter ($D_{10}$) means a particle diameter at a point of 10% in the particle number cumulative distribution depending on particle diameter.

According to an embodiment of the present disclosure, diameter ($D_n$), such as diameter ($D_{50}$), may be determined by using a laser diffraction method. Particularly, a material to be determined is dispersed in a dispersion medium, and the resultant dispersion is introduced to a commercially available laser diffraction particle size analyzer (e.g. Microtrac S3500) to determine a difference in diffraction pattern depending on particle size, when particles pass through laser beams, thereby providing particle size distribution. Then, $D_{10}$, $D_{50}$ and $D_{90}$ may be determined by calculating the particle diameter at a point of 10%, 50% and 90% in the particle number cumulative distribution depending on particle diameter.

In general, the laser diffraction method can determine a diameter ranging from a submicron region to several nanometers and can provide a result with high reproducibility and high resolution.

When forming a porous coating layer by using large-particle diameter inorganic particles according to the related art, the porous coating layer has a high porosity of about 55%, and thus a desired level of heat resistance may not be obtained.

On the contrary, the separator according to an embodiment of the present disclosure includes at least three types of particles having a different size in the porous coating layer. Therefore, the adhesive polymer particles and the small-particle diameter inorganic particles may be inserted between the adjacent large-particle diameter inorganic particles to provide increased packing density and improved heat resistance.

When using large-particle diameter inorganic particles alone according to the related art, the porous coating layer shows low packing density and high porosity, and thus cannot provide a desired level of heat resistance. When introducing small-particle diameter inorganic particles alone to solve this, the small-particle diameter inorganic particles are aggregated, and thus a porous coating layer itself cannot be formed.

Meanwhile, even when using large-particle diameter inorganic particles and small-particle diameter inorganic particles, the coating layer shows increased packing density and the conventional non-particle shaped binder, used in combination with such inorganic particles, infiltrates into the pores in the porous polymer substrate to cause the problem of high resistance of the separator. Under these circumstances, the present inventors have conducted intensive studies to improve the resistance characteristics of a separator and to increase the peel strength between the porous polymer substrate and the porous coating layer by introducing adhesive polymer particles having a predetermined size.

According to an embodiment of the present disclosure, 'large-particle diameter inorganic particles' have a diameter ($D_{50}$) of 600 nm or more. Particularly, the large-particle diameter inorganic particles may have a diameter ($D_{50}$) of 600 nm or more, 700 nm or more, or 800 nm or more, and 2 μm or less, 1.5 μm or less, or 1 μm or less. More particularly, the large-particle diameter inorganic particles may have a diameter of 600 nm to 1 μm, or 600-800 nm.

According to an embodiment of the present disclosure, 'small-particle diameter inorganic particles' have a diameter ($D_{50}$) of 10-100 nm. Particularly, the small-particle diameter inorganic particles may have a diameter ($D_{50}$) of 10 nm or more, 20 nm or more, or 30 nm or more, and 100 nm or less, 90 nm or less, or 80 nm or less. More particularly, the small-particle diameter inorganic particles may have a diameter ($D_{50}$) of 40-70 nm. According to an embodiment of the present disclosure, when the small-particle diameter inorganic particles have a diameter of 70-100 nm, it is possible to provide a separator advantageous in terms of resistance.

In this manner, it is possible to maximize the heat resistance of a separator by increase the difference in size between the large-particle diameter inorganic particles and the small-particle diameter inorganic particles. It is thought that this is because the small-particle diameter inorganic particles may be disposed between the adjacent large-particle diameter inorganic particles to cause an increase in the packing density of a separator.

Herein, the content of the small-particle diameter inorganic particles may be 30 parts by weight or more based on 100 parts by weight of the total content of the inorganic particles. Particularly, the content of the small-particle diameter inorganic particles may be 30 parts by weight or more, 35 parts by weight or more, or 40 parts by weight or more, and 50 parts by weight or less, 45 parts by weight or less, or 43 parts by weight or less, based on 100 parts by weight of the total content of the inorganic particles. More particularly, when the content of the small-particle diameter inorganic particles is 30-50 parts by weight, it is possible to maximize the heat resistance of a separator. It is thought that this is because the small-particle diameter inorganic particles may be disposed between the adjacent large-particle diameter inorganic particles to cause an increase in the packing density of a separator.

According to an embodiment of the present disclosure, the small-particle diameter inorganic particles and the large-particle diameter inorganic particles may be the same or different.

Herein, the inorganic particles are not particularly limited, as long as they are electrochemically stable. In other words, the inorganic particles are not particularly limited, as long as they cause no oxidation and/or reduction in the operating voltage range (e.g. 0-5 V based on Li/Li$^+$) of an applicable electrochemical device. Particularly, when using inorganic particles having a high dielectric constant, they contribute to an increase in dissociation degree of the electrolyte salt, particularly lithium salt, in a liquid electrolyte, and thus can improve ion conductivity of the electrolyte.

For these reasons, the inorganic particles may include inorganic particles having a dielectric constant of 5 or more, inorganic particles capable of transporting lithium ions or a mixture thereof.

The inorganic particles having a dielectric constant of 5 or more may include any one selected from the group consisting of $Al_2O_3$, $SiO_2$, $ZrO_2$, $AlO(OH)$, $TiO_2$, $BaTiO_3$, $Pb(Zr_xTi_{1-x})O_3$ (PZT, wherein 0<x<1), $Pb_{1-x}La_xZr_{1-y}Ti_yO_3$ (PLZT, wherein 0<x<1, 0<y<1), $(1-x)Pb(Mg_{1/3}Nb_{2/3})O_{3-x}$—$PbTiO_3$ (PMN-PT, wherein 0<x<1), hafnia ($HfO_2$), $SrTiO_3$, $SnO_2$, $CeO_2$, MgO, NiO, CaO, ZnO, $ZO_3$ and SiC, or a mixture of two or more of them.

Particular examples of the inorganic particles capable of transporting lithium ions include any one selected from the group consisting of lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$-based glass (0<x<4, 0<y<13), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$-based glass ($Li_xSi_yS_z$, 0<x<3, 0<y<2, 0<z<4) and $P_2S_5$-based glass ($Li_xP_yS_z$, 0<x<3, 0<y<3, 0<z<7), or a mixture of two or more of them.

Meanwhile, according to an embodiment of the present disclosure, adhesive polymer particles are used instead of a non-particle shaped binder polymer, and the adhesive polymer particles have a diameter ($D_{50}$) of 200 nm or less. It is possible to ensure the porosity in the porous coating layer by using a particle-shaped binder polymer, not a non-particle shaped binder polymer. In addition, since the adhesive polymer particles having a predetermined range of particle diameter are used, the adhesive polymer particles do not infiltrate into the pores in the porous polymer substrate, and thus are advantageous in that there is no increase in resistance.

For this purpose, the adhesive polymer particles have a diameter ($D_{50}$) larger than the pores of the porous polymer substrate. For example, the adhesive polymer particles may have a diameter ($D_{50}$) of 40 nm or more, 70 nm or more, 80 nm or more, 90 nm or more, or 100 nm or more. In addition, the adhesive polymer particles may have a diameter ($D_{50}$) of 40-200 nm, 40-100 nm, or 40-70 nm.

The adhesive polymer particles may include any one selected from the group consisting of styrene butadiene rubber (SBR), acrylonitrile-butadiene rubber, acrylonitrilebutadiene-styrene rubber, polybutyl acrylate-co-ethylhexyl acrylate, polymethyl methacrylate-co-ethylhexyl acrylate, polyacrylonitrile, polyvinyl chloride, polyvinylidene fluoride, polyvinyl alcohol, styrene and polycyanoacrylate, or a mixture of two or more of them.

Although there is no particular limitation in the thickness of the porous coating layer, the porous coating layer may have a thickness of 1-10 μm, particularly 1.5-6 μm.

In the separator according to an embodiment of the present disclosure, the porous polymer substrate may be a porous polymer film substrate or a porous polymer non-woven web substrate.

The porous polymer film substrate may include a porous polymer film including a polyolefin, such as polyethylene or polypropylene. For example, such a polyolefin porous polymer film substrate realizes a shut-down function at a temperature of 80-130° C.

Herein, the polyolefin porous polymer film may include a polymer formed of polyethylene, such as high-density polyethylene, linear low-density polyethylene, low-density polyethylene and ultrahigh-molecular weight polyethylene, polypropylene, polybutylene and polypentene, alone or in combination.

In addition, the porous polymer film substrate may be prepared by using various polymers, such as polyesters, in addition to polyolefins and forming the polymers into a film shape. The porous polymer film substrate may be formed to have a stacked structure of two or more film layers, wherein each film layer may include the abovementioned polymers, such as polyolefins and polyesters, alone or in combination.

In addition to the above-mentioned polyolefins, the porous polymer film substrate and the porous polymer non-woven web substrate may include polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalene, or the like, alone or in combination.

Although there is no particular limitation in the thickness of the porous polymer substrate, the porous polymer substrate may have a thickness of 1-100 μm, particularly 5-50 μm. Although the pore size and porosity of the pores present in the porous polymer substrate are not also limited particularly, it is preferred that the pore size and porosity are 0.01-50 μm and 10-95%, respectively.

According to an embodiment of the present disclosure, the porous polymer substrate may have an average pore size of 30-40 nm and a largest pore size of 60-70 nm.

In the separator according to an embodiment of the present disclosure, the binder polymer used for forming the porous coating layer may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the inorganic particles with one another, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45$^{1/2}$, it is difficult for the binder polymer to be swelled with a conventional liquid electrolyte for a battery.

Non-limiting examples of the binder polymer include polyvinylidene fluoride-co-hexafluoropropylene, polyvinylidene fluoride-co-trichloro ethylene, polymethyl methacrylate, polyethylhexyl acrylate, polybutyl acrylate, polyacrylonitrile, polyvinyl pyrrolidone, 2-ethylhexyl acetate, polymethyl methacrylate-co-butyl acrylate, polymethyl methacrylate-co-ethyl acrylate, polyvinyl acetate, polybutyl acrylate-co-ethylhexyl acrylate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, carboxymethyl cellulose, or the like.

For example, the weight ratio of the total content of the inorganic particles to the adhesive polymer particles is 50:50-99:1, particularly 70:30-95:5, and more particularly 80:20-90:10. When the weight ratio of the total content of the inorganic particles to the adhesive polymer particles satisfies the above-defined range, it is possible to prevent the problem of degradation of pore size and porosity of a coating layer, caused by an increased amount of adhesive polymer particles. It is also possible to solve the problem of weakening of peeling resistance of a porous coating layer, caused by a low amount of adhesive polymer particles.

Besides the above-mentioned inorganic particles and polymer, the separator according to an embodiment of the present disclosure may further include other additives as ingredients for the porous coating layer.

Meanwhile, the porous coating layer has a porosity of 40-50%. In the separator, the peel strength between the porous polymer substrate and the porous coating layer may be maintained at a high level of 50 gf/15 mm or more. For example, the peel strength may be 50 gf/15 mm or more, 55 gf/15 mm or more, or 60 gf/15 mm or more. In this manner, it is possible to provide a separator having reinforced interfacial adhesion and improved stability.

The separator according to an embodiment of the present disclosure has the above-defined range of adhesion and shows improved heat shrinkage. Particularly, the separator may satisfy the heat shrinkage as defined in Formula 1. More particularly, the heat shrinkage as defined in Formula 1 may be 10% or less, 9% or less, or 8% or less. As the heat shrinkage is decreased and the adhesion is increased, the separator shows improved safety.

In addition, it is possible to provide a separator showing a low resistance value.

In another aspect, there is provided a method for manufacturing a separator.

Particularly, there is provided a method for manufacturing a separator for a lithium secondary battery including a porous polymer substrate and a porous coating layer formed on at least one surface of the porous polymer substrate, the method including the steps of:
- (S1) preparing slurry for forming a porous coating layer including small-particle diameter inorganic particles having a diameter ($D_{50}$) of 10-100 nm, large-particle diameter inorganic particles having a diameter ($D_{50}$) of 600 nm or more and adhesive polymer particles having a diameter ($D_{50}$) of 200 nm or less; and
- (S2) applying the slurry for forming a porous coating layer onto a porous polymer substrate having a plurality of pores, followed by drying, to form a porous coating layer, wherein the slurry for forming a porous coating layer has a solid content of 25-35%.

According to an embodiment of the present disclosure, the peel strength between the porous polymer substrate and the porous coating layer is 50 gf/15 mm or more, and the separator satisfies the following Formula 1:

$$(MD+TD)/2 \leq 10\%, \quad \text{[Formula 1]}$$

wherein MD represents the heat shrinkage of the separator in the machine direction (MD), and TD represents the heat shrinkage of the separator in the transverse direction (TD), and the heat shrinkage is calculated by the formula of (Initial length of separator−Length after heat shrinking treatment at 150° C. for 30 minutes)/(Initial length of separator)×100.

First, slurry for forming a porous coating layer is prepared as follows. Particularly, the large-particle diameter inorganic particles, the small-particle diameter inorganic particles and the adhesive polymer particles are introduced to and dispersed in a solvent. Herein, the large-particle diameter inorganic particles and the small-particle diameter inorganic particles may be added, after they are pulverized into a predetermined diameter. In a variant, the inorganic particles may be dispersed, while being controlled and pulverized to have a predetermined diameter by using a ball milling process, or the like.

The solvent used herein preferably has a solubility parameter similar to the solubility parameter of the binder polymer to be used and has a low boiling point. This is because such a solvent facilitates homogeneous mixing and the subsequent solvent removal. Non-limiting examples of the solvent that may be used herein include any one selected from water, acetone, tetrahydrofuran, methylene chloride, chloroform, dimethylformamide, N-methyl-2-pyrrolidone, methyl ethyl ketone and cyclohexane, or a mixture of two or more of them.

Herein, the solid content in the slurry for forming a porous coating layer is 25-35%. The term 'solid content' refers to a content of dry materials obtained after drying the solvent in the slurry, as expressed by a percentage based on the total content of the slurry. It is possible to control the porosity of the porous coating layer to 40-50% by controlling the solid content as mentioned above. In this manner, it is possible to provide a separator having improved adhesion and heat shrinkage and showing reduced resistance.

Next, the slurry for forming a porous coating layer is applied to a porous polymer substrate, followed by drying (S2).

Although there is no particular limitation in the process for coating the slurry for forming a porous coating layer onto the porous polymer substrate, it is preferred to use a slot coating or dip coating process. A slot coating process includes coating a composition supplied through a slot die onto the whole surface of a substrate and is capable of controlling the thickness of a coating layer depending on the flux supplied from a metering pump. In addition, a dip coating process includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous polymer substrate coated with the slurry for forming a porous coating layer is dried by using a dryer, such as an oven, thereby forming a porous coating layer on at least one surface of the porous polymer substrate.

In the porous coating layers, the large-particle diameter inorganic particles and the small-particle diameter inorganic particles are bound with one another by the adhesive polymer particles, while they are packed and are in contact with each other. Thus, interstitial volumes are formed among the large-particle diameter inorganic particles and/or the small-particle diameter inorganic particles, and the interstitial volumes among the inorganic particles become vacant spaces to form pores.

In other words, the adhesive polymer particles attach the inorganic particles to one another so that they may retain their binding states. For example, the adhesive polymer particles connect and fix the large-particle diameter inorganic particles and/or the small-particle diameter inorganic particles with one another. In addition, the pores of the porous coating layer are those formed by the interstitial volumes among the large-particle diameter inorganic particles, the small-particle diameter inorganic particles and the adhesive polymer particles, which become vacant spaces. The spaces are defined by the inorganic particles and/or the adhesive polymer particles facing one another substantially in a closely packed or densely packed structure of the large-particle diameter inorganic particles, the small-particle diameter inorganic particles and the adhesive polymer particles.

In still another aspect of the present disclosure, there is provided an electrochemical device including a positive electrode, a negative electrode and a separator interposed between the positive electrode and the negative electrode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors such as super capacitor devices. Particularly, among the secondary batteries, lithium secondary batteries, including lithium metal secondary batteries, lithium-ion secondary batteries, lithium polymer secondary batteries or lithium-ion polymer secondary batteries, are preferred.

The two electrodes, positive electrode and negative electrode, used in combination with the separator according to the present disclosure are not particularly limited, and may be obtained by allowing electrode active materials to be bound to an electrode current collector through a method generally known in the art. Among the electrode active materials, non-limiting examples of a positive electrode active material include conventional positive electrode active materials that may be used for the positive electrodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of a negative electrode active material include conventional negative electrode active materials that may be used for the negative electrodes for conventional electrochemical devices. Particularly, lithium-intercalating materials, such as lithium metal or lithium alloys, carbon, petroleum coke, activated carbon, graphite or other carbonaceous materials are used preferably. Non-limiting examples of a positive electrode current collector include foil made of aluminum, nickel or a combination thereof. Non-limiting examples of a negative electrode current collector include foil made of copper, gold, nickel, copper alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

At room temperature, adhesive polymer particles (acrylic binder (polymethyl methacrylate-co-ethyl acrylate), $D_{50}$: 150 nm), small-particle diameter inorganic particles (AlOOH, $D_{50}$: 70 nm) and large-particle diameter inorganic particles ($Al_2O_3$, $D_{50}$: 800 nm) were dispersed in water as a solvent to prepare slurry for forming a porous coating layer. Herein, the weight ratio of the small-particle diameter inorganic particles to the large-particle diameter inorganic particles was 35:65, and the weight ratio of the total content of the inorganic particles to the adhesive polymer particles was 90:10. Herein, the slurry for forming a porous coating layer had a solid content of 30% based on the total content of the slurry. The term 'solid content' refers to a content of dry materials obtained after drying the solvent in the slurry, as expressed by a percentage based on the total content of the slurry.

Then, the slurry for forming a porous coating layer was coated on a porous polymer substrate having a thickness of 11 μm (mono sequential stretched separator, porosity 41%, average pore size 33 nm) through dip coating, followed by drying, to form a porous coating layer having a thickness of 1.5 μm on one surface of the substrate.

The formed porous coating layer had a porosity of 40% and a thickness of 12.4 μm.

Examples 2 and 3

The separators were obtained in the same manner as Example 1, except that the types and contents of the particles introduced to the slurry for forming a porous coating layer were controlled as shown in the following Table 1.

Comparative Examples 1-6

The separators were obtained in the same manner as Example 1, except that the types and contents of the particles introduced to the slurry for forming a porous coating layer were controlled as shown in the following Table 1.

TABLE 1

| | | Comp. Ex. 1 | Comp. Ex. 2 | Ex. 1 | Ex. 2 | Ex. 3 |
|---|---|---|---|---|---|---|
| Composition | Large-particle diameter inorganic particles | $Al_2O_3$, 800 nm | $Al_2O_3$, 800 nm | $Al_2O_3$, 800 nm | $Al_2O_3$, 800 nm | $Al_2O_3$, 800 nm |
| | Small-particle diameter inorganic particles | AlOOH, 70 nm | AlOOH, 70 nm | AlOOH, 70 nm | AlOOH, 70 nm | AlOOH, 70 nm |
| | Adhesive polymer particles | Acrylic binder (polymethyl methacrylate-co-ethyl acrylate), 150 nm | Acrylic binder (polymethyl methacrylate-co-ethyl acrylate), 150 nm | Acrylic binder (polymethyl methacrylate-co-ethyl acrylate), 150 nm | Acrylic binder (polymethyl methacrylate-co-ethyl acrylate), 150 nm | Acrylic binder (polymethyl methacrylate-co-ethyl acrylate), 150 nm |
| | Weight ratio of large-particle diameter inorganic particles:small-particle diameter inorganic particles: | 65:35 | 65:35 | 65:35 | 65:35 | 65:35 |
| | Solid content | 50% | 40% | 35% | 30% | 25% |

TABLE 1-continued

| | | | | | |
|---|---|---|---|---|---|
| Porosity of porous coating layer (%) | 35 | 38.3 | 40 | 48.5 | 50 |
| Thickness (μm) | 14.8 | 12.4 | 12.5 | 12.6 | 13.0 |
| Peel strength (gf/15 mm) | 50.0 | 52.0 | 55.0 | 64.0 | 50.5 |
| Heat shrinkage (%) 150° C./30 min   MD | 5.0 | 6.3 | 7.0 | 7.3 | 10.0 |
| TD | 6.2 | 8.0 | 8.0 | 8.0 | 10.0 |
| Resistance (ohm) | 0.85 | 0.66 | 0.49 | 0.45 | 0.43 |
| Remarks | | | | | |

| | | Comp. Ex. 3 | Comp. Ex. 4 | Comp. Ex. 5 | Comp. Ex. 6 |
|---|---|---|---|---|---|
| Composition | Large-particle diameter inorganic particles | $Al_2O_3$, 800 nm | — | $Al_2O_3$, 800 nm | $Al_2O_3$, 800 nm |
| | Small-particle diameter inorganic particles | AlOOH, 70 nm | AlOOH, 70 nm | — | AlOOH, 70 nm |
| | Adhesive polymer particles | Acrylic binder (polymethyl methacrylate-co-ethyl acrylate), 150 nm | Acrylic binder (polymethyl methacrylate-co-ethyl acrylate), 150 nm | Acrylic binder (polymethyl methacrylate-co-ethyl acrylate), 150 nm | — |
| | Weight ratio of large-particle diameter inorganic particles:small-particle diameter inorganic particles: | 65:35 | — | — | 65:35 |
| | Solid content | 20% | — | 40% | 40% |
| Porosity of porous coating layer (%) | | 55.3 | Coating layer cannot be formed | 58 | 37 |
| Thickness (μm) | | 13.7 | | 13.5 | 12.8 |
| Peel strength (gf/15 mm) | | 45.6 | | 40.2 | 30.5 |
| Heat shrinkage (%) 150° C./30 min   MD | | 13.3 | | 18.2 | 6.5 |
| TD | | 14.0 | | 17.3 | 7.3 |
| Resistance (ohm) | | 0.4 | | 0.38 | 0.7 |
| Remarks | | | Large-particle diameter inorganic particles X | Small-particle diameter inorganic particles X | Adhesive polymer particles X |

Examples 4-6

The separators were obtained in the same manner as Example 1, except that the particle size of small-particle diameter inorganic particles was changed into 40 nm and the types and contents of the particles introduced to the slurry for forming a porous coating layer were controlled as shown in the following Table 2.

Comparative Examples 7-9

The separators were obtained in the same manner as Example 1, except that the types and contents of the particles introduced to the slurry for forming a porous coating layer were controlled as shown in the following Table 2.

TABLE 2

| | | Comp. Ex. 7 | Comp. Ex. 8 | Ex. 4 | Ex. 5 | Ex. 6 | Comp. Ex. 9 |
|---|---|---|---|---|---|---|---|
| Composition | Large-particle diameter inorganic particles | $Al_2O_3$, 800 nm | $Al_2O_3$, 800 nm | $Al_2O_3$, 800 nm | $Al_2O_3$, 800 nm | $Al_2O_3$, 800 nm | $Al_2O_3$, 800 nm |
| | Small-particle diameter inorganic particles | AlOOH, 40 nm | AlOOH, 40 nm | AlOOH, 40 nm | AlOOH, 40 nm | AlOOH, 40 nm | AlOOH, 40 nm |
| | Adhesive polymer particles | Acrylic binder (polymethyl methacrylate-co-ethyl acrylate), 150 nm | Acrylic binder (polymethyl methacrylate-co-ethyl acrylate), 150 nm | Acrylic binder (polymethyl methacrylate-co-ethyl acrylate), 150 nm | Acrylic binder (polymethyl methacrylate-co-ethyl acrylate), 150 nm | Acrylic binder (polymethyl methacrylate-co-ethyl acrylate), 150 nm | Acrylic binder (polymethyl methacrylate-co-ethyl acrylate), 150 nm |
| | Weight ratio of large-particle diameter inorganic particles:small-particle diameter inorganic particles: | 65:35 | 65:35 | 65:35 | 65:35 | 65:35 | 65:35 |
| | Solid content | 50% | 40% | 35% | 30% | 25% | 20% |

TABLE 2-continued

| | Comp. Ex. 7 | Comp. Ex. 8 | Ex. 4 | Ex. 5 | Ex. 6 | Comp. Ex. 9 |
|---|---|---|---|---|---|---|
| Porosity of porous coating layer (%) | 30 | 35.0 | 40 | 45.0 | 50 | 53.8 |
| Thickness (μm) | 14.5 | 12.4 | 12.5 | 12.6 | 13.0 | 13.6 |
| Peel strength (gf/15 mm) | 50.5 | 52.5 | 60.2 | 74.6 | 69.8 | 66.6 |
| Heat shrinkage (%) MD 150° C./30 min | 4.5 | 6.7 | 7.0 | 8.0 | 10.0 | 16.0 |
| TD | 6.0 | 8.0 | 9.0 | 9.3 | 10.0 | 12.0 |
| Resistance (ohm) | 1.2 | 0.90 | 0.58 | 0.51 | 0.48 | 0.45 |

Comparative Example 10

The separator was obtained in the same manner as Example 2, except that the particle size of adhesive polymer particles was changed into 400 nm and the types and contents of the particles introduced to the slurry for forming a porous coating layer were controlled as shown in the following Table 3.

TABLE 3

| | | Ex. 2 | Comp. Ex. 10 |
|---|---|---|---|
| Composition | Large-particle diameter inorganic particles | Al$_2$O$_3$, 800 nm | Al$_2$O$_3$, 800 nm |
| | Small-particle diameter inorganic particles | AlOOH, 70 nm | AlOOH, 70 nm |
| | Adhesive polymer particles | Acrylic binder (polymethyl methacrylate-co-ethyl acrylate), 150 nm | Acrylic binder (polymethyl methacrylate-co-ethyl acrylate), 400 nm |
| | Weight ratio of large-particle diameter inorganic particles: small-particle diameter inorganic particles: | 65:35 | 65:35 |
| | Solid content | 30% | 30% |
| Porosity of porous coating layer (%) | | 48.5 | 50.6 |
| Thickness (μm) | | 12.6 | 12.5 |
| Peel strength (gf/15 mm) | | 64.0 | 20.0 |
| Heat shrinkage (%) MD 150° C./30 min | | 7.3 | 37.0 |
| TD | | 8.0 | 35.0 |
| Resistance (ohm) | | 0.45 | 0.50 |
| Remarks | | | Size of adhesive polymer particles is changed. |

As can be seen from Comparative Example 5 in table 1, when using large-particle diameter inorganic particles alone, the separator shows a heat shrinkage of 18.2% and 17.3% in MD and TD, respectively, suggesting that the separator has poor heat resistance.

As can be seen from Comparative Example 4 in Table 1, when using small-particle diameter inorganic particles alone, a porous coating layer itself cannot be formed.

As can be seen from Comparative Example 6 in Table 1, when using large-particle diameter inorganic particles in combination with small-particle diameter inorganic particles but using no adhesive binder particles, the separator shows significantly low peel strength.

Meanwhile, when the porous coating layer has a porosity of less than 40% in the case of Comparative Examples 1 and 2, the separator shows low peel strength and particularly shows significantly increased resistance, and thus is not suitable as a separator for a lithium secondary battery.

On the contrary, according to Examples 1-3 of the present disclosure, it is possible to provide a separator having high peel strength, improved heat shrinkage and a low resistance value.

[Test Methods]

1) Determination of Thickness

The thickness of a separator was determined by using a thickness gauge (VL-50S-B, available from Mitutoyo).

2) Determination of Resistance of Separator

The resistance of each of the separators according to Examples and Comparative Examples means a resistance value measured when the separator is impregnated with an electrolyte. It was determined through impedance analysis by using an electrolyte containing 1 M LiPF$_6$ in ethylene carbonate/ethylmethyl carbonate (weight ratio 3:7) at 25° C.

3) Determination of Heat Shrinkage

The heat shrinkage in the machine direction (MD) and the heat shrinkage in the transverse direction (TD) were calculated according to the following formula:

Heat shrinkage=(Initial length of separator−Length after heat shrinking treatment at 150° C. for 30 minutes)/(Initial length of separator)×100.

4) Determination of Peel Strength

Each of the separators according to Examples and Comparative Examples was cut into a size of 15 mm×100 mm. A double-sided adhesive tape was attached to a glass plate and the separator was adhered to the glass plate in such a manner that the porous coating layer surface of the separator might be adhered to the adhesive tape. Then, the end of the adhered separator was mounted to an UTM system (LLOYD Instrument LF Plus), and then the force required for separating the porous coating layer from the porous polymer substrate was measured by applying force thereto at 180° with a rate of 300 mm/min.

5) Determination of Porosity of Porous Coating Layer

Each of the separators according to Examples and Comparative Examples was cut into a size of 1.7671 cm$^2$, and the weight and volume of the separator were measured (apparent density was determined) and compared with a designed dimension (true density) to calculate the porosity. In other words, the true density of each separator was calculated from the compositional ratio of the ingredients contained in the separator and the density of each ingredient, and the porosity was calculated from the difference between the apparent density and the true density.

6) Determination of Diameter ($D_{50}$)

The diameter ($D_{50}$) was determined by introducing particles to a laser diffraction particle size analyzer (Microtrac S3500) to measure a difference in diffraction pattern depending on particle size, when the particles pass through laser beams, thereby providing particle size distribution. Then, $D_{50}$ was determined by calculating the particle diameter at a point of 50% in the particle number cumulative distribution depending on particle diameter in the particle size analyzer.

DESCRIPTION OF DRAWING NUMERALS

1: Large-particle diameter inorganic particles
2: Adhesive polymer particles
3: Small-particle diameter inorganic particles
4: Porous polymer substrate

What is claimed is:

1. A separator for a lithium secondary battery, comprising:
a porous polymer substrate having a plurality of pores; and
a porous coating layer formed on at least one surface of the porous polymer substrate, wherein the porous coating layer comprises a plurality of inorganic particles and adhesive polymer particles positioned on a whole or a part of a surface of the inorganic particles to connect and fix the inorganic particles with one another,
wherein the inorganic particles comprise small-particle diameter inorganic particles having a diameter ($D_{50}$) of 10 nm to 100 nm and large-particle diameter inorganic particles having a diameter ($D_{50}$) of 600 nm or more, and an amount of the small-particle diameter inorganic particles is 30 parts by weight or more based on 100 parts by weight of a total amount of the inorganic particles,
wherein the adhesive polymer particles have a diameter ($D_{50}$) of 200 nm or less, and
wherein the porous coating layer has a porosity of 40% to 50%.

2. The separator for the lithium secondary battery according to claim 1, wherein a peel strength between the porous polymer substrate and the porous coating layer is 50 gf/15 mm or more, and the separator satisfies the following Formula 1:

(MD+TD)/2≤10%, [Formula 1]

wherein MD represents a heat shrinkage of the separator in a machine direction (MD), and TD represents a heat shrinkage of the separator in a transverse direction (TD), and
wherein the heat shrinkage is calculated by the formula:

(Initial length of separator−Length after heat shrinking treatment at 150° C. for 30 minutes)/(Initial length of separator)×100.

3. The separator for the lithium secondary battery according to claim 1, wherein the amount of the small-particle diameter inorganic particles is 30 parts by weight to 50 parts by weight based on 100 parts by weight of the total amount of the inorganic particles.

4. The separator for the lithium secondary battery according to claim 1, wherein the adhesive polymer particles comprise at least one selected from the group consisting of styrene butadiene rubber (SBR), acrylonitrile-butadiene rubber, acrylonitrile-butadiene-styrene rubber, polybutyl acrylate-co-ethylhexyl acrylate, polymethyl methacrylate-co-ethylhexyl acrylate, polyacrylonitrile, polyvinyl chloride, polyvinylidene fluoride, polyvinyl alcohol, styrene and polycyanoacrylate, or a mixture of two or more of them.

5. The separator for the lithium secondary battery according to claim 1, wherein each of the small-particle diameter inorganic particles and the large-particle diameter inorganic particles independently comprises at least one selected from the group consisting of $BaTiO_3$, $Pb(Zr_xTi_{1-x})O_3$ (PZT, 0<x<1), $Pb_{1-x}La_xZr_{1-y}Ti_yO_3$ (PLZT, 0<x<1,0<y<1), (1−x)$Pb(Mg_{1/3}Nb_{2/3})O_3$-$_x$$PbTiO_3$ (PMNPT, 0<x<1), hafnia ($HfO_2$), $SrTiO_3$, $SnO_2$, $CeO_2$, MgO, NiO, CaO, ZnO, $ZrO_2$, $Al_2O_3$, AlO(OH), $TiO_2$ and SiC.

6. The separator for the lithium secondary battery according to claim 1, wherein the small-particle diameter inorganic particles and the large-particle diameter inorganic particles are the same or different.

7. The separator for the lithium secondary battery according to claim 1, wherein a weight ratio of a total amount of the inorganic particles to the adhesive polymer particles is 50:50 to 99:1.

8. The separator for the lithium secondary battery according to claim 1, wherein the porous coating layer has a thickness of 1 μm to 10 μm.

9. A lithium secondary battery, comprising:
a positive electrode,
a negative electrode, and
a separator interposed between the positive electrode and the negative electrode,
wherein the separator is the same as defined in claim 1.

10. A method for manufacturing a separator for a lithium secondary battery comprising a porous polymer substrate having a plurality of pores, and a porous coating layer on at least one surface of the porous polymer substrate, the method comprising the steps of:
(S1) preparing a slurry for forming the porous coating layer comprising small-particle diameter inorganic particles having a diameter ($D_{50}$) of 10 nm to 100 nm, large-particle diameter inorganic particles having a diameter ($D_{50}$) of 600 nm or more, and adhesive polymer particles having a diameter ($D_{50}$) of 200 nm or less; and
(S2) applying the slurry for forming the porous coating layer onto the porous polymer substrate having a plurality of pores, followed by and drying the slurry to form the porous coating layer,
wherein the slurry for forming the porous coating layer has a solid content of 25% to 35%.

11. The method for manufacturing the separator for the lithium secondary battery according to claim 10, wherein the porous coating layer has a porosity of 40% to 50%.

12. The method for manufacturing the separator for the lithium secondary battery according to claim 10, wherein an amount of the small-particle diameter inorganic particles is 30 parts by weight to 50 parts by weight based on 100 parts by weight of a total amount of the inorganic particles.

13. The method for manufacturing the separator for the lithium secondary battery according to claim 10, wherein a weight ratio of a total content amount of the inorganic particles to the adhesive polymer particles is 50:50 to 99:1.

14. The method for manufacturing the separator for the lithium secondary battery according to claim 10, wherein a peel strength between the porous polymer substrate and the porous coating layer is 50 gf/15 mm or more, and the separator satisfies the following Formula 1:

(MD+TD)/2≤10%, [Formula 1]

wherein MD represents a heat shrinkage of the separator in a machine direction (MD), and TD represents a heat shrinkage of the separator in a transverse direction (TD), and wherein the heat shrinkage is calculated by a formula:

(Initial length of separator−Length after heat shrinking treatment at 150° C. for 30 minutes)/(Initial length of separator)×100.

* * * * *